United States Patent
Speidel et al.

(10) Patent No.: US 12,469,855 B2
(45) Date of Patent: Nov. 11, 2025

(54) SEPARATOR PLATE WITH A HOMOGENIZED BEAD STRENGTH IN THE PORT REGION

(71) Applicant: Reinz-Dichtungs-GmbH, Neu-Ulm (DE)

(72) Inventors: Andre Speidel, Neu-Ulm (DE); Bernd Gaugler, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 793 days.

(21) Appl. No.: 17/659,279

(22) Filed: Apr. 14, 2022

(65) Prior Publication Data

US 2022/0336825 A1 Oct. 20, 2022

(30) Foreign Application Priority Data

Apr. 16, 2021 (DE) .................... 20 2021 102 059.8

(51) Int. Cl.
*H01M 8/025* (2016.01)
*H01M 8/0256* (2016.01)
*H01M 8/0267* (2016.01)

(52) U.S. Cl.
CPC ......... *H01M 8/025* (2013.01); *H01M 8/0256* (2013.01); *H01M 8/0267* (2013.01)

(58) Field of Classification Search
CPC .. H01M 8/025; H01M 8/0256; H01M 8/0267; H01M 8/0204; H01M 8/0247; H01M 8/2404; H01M 8/10; H01M 8/0232; H01M 8/188; Y02E 60/50; C25B 9/60; C25B 9/75; C25B 9/77; C25B 15/08; C25B 1/04; C25B 13/02; C25C 7/04
See application file for complete search history.

(56) References Cited

U.S. PATENT DOCUMENTS

| 2003/0215678 A1* | 11/2003 | Barton | H01M 8/0269 429/465 |
| 2018/0241049 A1* | 8/2018 | Gruenwald | H01M 8/0247 |

* cited by examiner

*Primary Examiner* — Matthew T Martin
*Assistant Examiner* — Kevin Song
(74) *Attorney, Agent, or Firm* — McCoy Russell LLP

(57) ABSTRACT

Systems and methods for separator plates, bipolar plates, stacks of plates, and electrochemical systems, comprising at least one through-opening for the passage of a fluid and a rim that delimits the through-opening. The rim having a curved course and a rectilinear course that adjoins the curved course. A bead arrangement extends around the curved course and the rectilinear course. An edge portion spans the bead arrangement and the rim, so that the bead arrangement is situated at a distance from the rim. A cutout formed in the curved course, so that a minimum distance of the bead arrangement from the rim is smaller in the curved course than in the rectilinear course.

19 Claims, 5 Drawing Sheets

(A-A)

(B-B)

(C-C)

(D-D)

SEPARATOR PLATE WITH A HOMOGENIZED BEAD STRENGTH IN THE PORT REGION

CROSS-REFERENCE TO RELATED APPLICATION

The present application claims priority to German Utility Model Application No. 20 2021 102 059.8, entitled "SEPARATOR PLATE WITH A HOMOGENIZED BEAD STRENGTH IN THE PORT REGION" and filed on Apr. 16, 2021. The entire contents of the above-listed application is hereby incorporated by reference for all purposes.

TECHNICAL FIELD

The present disclosure relates to a separator plate for an electrochemical system, to a bipolar plate comprising two such separator plates, and to an electrochemical system comprising a plurality of such separator plates or bipolar plates. The electrochemical system may be, for example, a fuel cell system, an electrochemical compressor, a redox flow battery, or an electrolyser.

BACKGROUND AND SUMMARY

Known electrochemical systems usually comprise a stack of electrochemical cells, which are in each case separated from each other between the bipolar plates. Such bipolar plates may serve, for example, for indirectly electrically contacting the electrodes of the individual electrochemical cells (for example fuel cells) and/or for electrically connecting adjacent cells (series connection of the cells). The bipolar plates are typically formed of two individual separator plates which are joined together. The separator plates of the bipolar plate may be joined together in a materially bonded manner, for example by one or more welded joints, such as by one or more laser-welded joints.

The bipolar plates and/or the separator plates may each have or form structures which are configured for example to supply one or more media to the electrochemical cells bounded by adjacent bipolar plates and/or to remove reaction products therefrom. The media may be fuels (for example hydrogen or methanol) or reaction gases (for example air or oxygen). Furthermore, the bipolar plates and/or the separator plates may have structures for guiding a cooling medium through the bipolar plate, for instance through a cavity enclosed by the separator plates of the bipolar plate. Furthermore, the bipolar plates may be designed to transmit the waste heat that arises when converting electrical and/or chemical energy in the electrochemical cell, and also to seal off the various media channels and cooling channels with respect to one another and/or with respect to the outside.

Furthermore, the bipolar plates or the separator plates usually each have one or more through-openings. Through the through-openings, the media and/or the reaction products can be conducted to the electrochemical cells bounded by adjacent bipolar plates of the stack or into the cavity formed by the separator plates of the bipolar plate, or can be conducted out of the cells or out of the cavity. The through-openings are usually arranged in alignment with one another and form fluid lines which extend in the stacking direction, that is to say perpendicular to the plate planes of the respective separator plates or bipolar plates.

The electrochemical cells typically also each comprise one or more membrane electrode assemblies (MEAs). The MEAs may have one or more gas diffusion layers, which are usually oriented towards the bipolar plates and are designed for example as a metal or carbon fleece.

The sealing between the bipolar plates and the membrane electrode assembly usually takes place outside the electrochemically active region and usually comprises both at least one port seal, which is arranged around the through-opening, and an outer seal, it being possible for these to be formed as bead arrangements. However, at least the port seals, but in some cases also the outer seal, are often intended to permit a deliberate local passage of media from the through-opening to or from the electrochemically active region. To this end, bead arrangements may have passages that may be designed either as openings or as elevations in their flanks.

To ensure good efficiency of the electrochemical system, it is usually advantageous to make the surface area of the electrochemically active region of the separator plate or bipolar plate as large as possible, and to keep the proportion of the surface area of other structures, such as the through-openings, as small as possible. For example, instead of circular through-openings, through-openings of different shape, such as polygonal, such as rectangular through-openings, may be provided in order to make the most efficient use of the surface area of the separator plate. The associated port seal extending around the through-opening then usually has a corresponding polygonal or rectangular shape.

In general, a bead stiffness of a bead arrangement is not constant along a main direction of extension of the bead arrangement due to the shape and course of adjacent elements, for example an edge adjoining the bead arrangement. Furthermore, different types of course of the bead arrangement, for example rectilinear or curved portions, lead to different bead stiffnesses in portions that have different types of course. The aforementioned influencing factors may lead to a local increase or decrease in the elasticity of the bead arrangements, which in turn may have a negative effect on the actual compression of the respective bead arrangement in its various portions. There is a risk here that media will flow through the bead arrangement in regions of lower compression, and/or that operating media will flow into the interior of the bipolar plate and coolant will flow out to the exterior of the bipolar plate. On the one hand, the media in question will be lost for operation of the electrochemical system and may possibly trigger uncontrolled reactions that may damage the system. On the other hand, there is a risk that coolant will enter the region of the operating media and damage the MEA there, for example.

Due to the large number of bipolar plates or individual plates in a stack, a small difference in the compression and springback of the bead arrangement along the course thereof in one single bipolar plate or in one single separator plate may lead to a relatively large difference in the springback of the bead arrangements connected in series, so that small differences in the individual separator plates have a significant effect on the leaktightness of the stack as a whole.

The object of the present disclosure is therefore to provide a separator plate and a bipolar plate for an electrochemical system, which ensures the most efficient possible operation of the electrochemical system. In addition, the aim is also to specify an electrochemical system comprising a plurality of stacked bipolar plates.

This object is achieved by embodiments of the separator plate, the bipolar plate and the electrochemical system described herein.

The separator plate for an electrochemical system comprises
- at least one through-opening for the passage of a fluid, having a rim that delimits the through-opening, wherein the rim has at least one corner region with a curved course and a first region with a rectilinear first course that adjoins the corner region; and
- a bead arrangement that extends around the corner region and the first region.

An edge portion is spanned between the bead arrangement and the rim, so that the bead arrangement is situated at a distance from the rim, wherein the edge portion has a cutout in the corner region, so that a minimum distance of the bead arrangement from the rim is smaller in the corner region than in the first region. By way of example, the smallest distance of the rim from the bead foot in the first region may be 2 mm, while the corresponding width of the edge region in the narrowest region of the corner region may be 0.2 mm. The edge region may therefore be reduced in the corner region to ⅟₁₀ of its width in the first region.

Due to a shape of the through-opening in the corner region, the bead arrangement typically has a more pronounced curvature there, which usually leads to a greater stiffness of the bead arrangement in this region; for instance, the compressive stress increases. By providing the cutout in the edge portion, it is possible to prevent compressive stresses from building up there in the material of the separator plate. A local stiffness of the bead arrangement in the corner region of the through-opening can thus be reduced, as a result of which a more uniform force distribution on the bead arrangement can be achieved when the separator plate is installed in the electrochemical system. It can thus be better ensured that the separator plate installed in an electrochemical system and an adjacent separator plate make contact with each other in a substantially uniform manner all the way around in the region of the bead arrangement. By homogenizing the compression force around the bead arrangement, unwanted local deformations of the separator plate can be reduced. Unwanted points of contact between adjacent bipolar plates are avoided, thereby providing better protection against short circuits. Overall, therefore, the functional reliability of the bead arrangement can be improved.

It may be provided that the cutout faces a concave portion of the bead arrangement. By way of example, the rim may likewise have a concave course in the region of the cutout, wherein, by way of example, a radius of the concave course of the rim may be smaller than a radius of the bead course. However, in the region of the cutout, the rim may also have a course in which at least one convex region, at least one concave region and at least one convex region alternate. The transitions are in this case usually fluid. The convex regions of the cutout typically directly adjoin the region of the rim that has a rectilinear course and that has no cutout.

It may be provided that a radius of curvature of the cutout, such as in the concave portion, is at least 3 mm, and/or a radius of curvature of the course of the bead arrangement relative to the neutral axis of the bead in the region of the cutout is at least 5 mm. In the region of the cutout, the rim may follow at least in part a segment of a circle, a segment of an oval or a segment of an ellipse. Optionally, in the region of the cutout, the rim and the bead arrangement have at least in part an identical course, so that the minimum distance of the bead arrangement from the rim is constant there.

A stiffening structure for strengthening the edge portion may be provided in the first region. Usually no such stiffening structure is provided in the corner region on account of the cutout. On the one hand, there is usually no space for such a stiffening structure on account of the cutout. On the other hand, a reduction in stiffness is actually desired in the corner region. To form the stiffening structure, the rim may project at least in part out of a plate plane defined by the separator plate, for example may deliberately be deformed out of the plane in which the bead merges into the edge portion, hereinafter also referred to as the plate plane of the separator plate. Optionally, the rim projecting out of the plate plane forms the stiffening structure for the edge portion by way of a portion of the edge portion that is likewise deformed out of the aforementioned plane, such as a portion that is situated at a distance from the bead and that extends along the rim. The edge portion between the rim and the bead arrangement usually comprises at least one region that lies in the plate plane defined by the separator plate. This region can act as a contact area, in which the separator plate makes contact with another separator plate.

Optionally, the bead arrangement has a periodic course, such as a wavy course, or a rectilinear course in a portion facing the first region. In this first region, the bead arrangement or a main direction of extension of the bead arrangement generally extends parallel to the rim of the through-opening. The bead arrangement may have the aforementioned periodic or rectilinear course all the way round, with the exception of the corner region, possibly also with the exception of several corner regions, or may have an alternation of periodic and rectilinear course portions. The bead arrangement often has an arc-shaped course in a portion facing the cutout.

The bead arrangement is usually designed as an embossed structure and as such may be integrally formed in the material of the separator plate, for example by hydroforming, embossing and/or deep drawing. The bead arrangement is thus formed integrally with the material of the separator plate. The separator plates may each be manufactured from a metal sheet, for example from a stainless steel sheet. They may also be coated at least in part. The bead arrangement may for example have the following features:
- a substantially flat bead top, at least one bead flank adjoining the bead top, and for each bead flank a bead foot adjoining the bead flank, or
- a curved bead top that merges directly into curved or rectilinear bead flanks, and for each bead flank a bead foot adjoining the bead flank.

Alternative bead shapes, such as complex bead shapes, are also possible.

Optionally, the rim has a second region with a rectilinear second course that adjoins the corner region, wherein the first region and the second region adjoin different sides of the corner region, that is to say are arranged on each side of the corner region. The above-mentioned features of the first region with the rectilinear first course can also apply to and be claimed for the second region with the rectilinear second course. Furthermore, the above-mentioned features of the bead arrangement and/or of the cutout that have been mentioned in connection with the first region can also apply and be claimed in connection with the second region.

The first region with the rectilinear first course and the second region with the rectilinear second course are usually oriented at an angle to each other and enclose a first angle. For instance, if the cutout is designed as a segment of a circle, the rim in the region of the cutout may span a circumferential angle. However, the aforementioned circumferential angle can also be defined for cutouts that have a different shape. A circumferential angle of the rim in the region of the cutout is often larger than the aforementioned first angle, for example at least 10% or at least 20% larger.

The through-opening may have a substantially polygonal shape, for example a triangular, quadrangular, rectangular, square, pentagonal or hexagonal shape, and may be designed as a polygon, for example as a regular or irregular polygon. For a regular n-sided polygon where n>2, the aforementioned first angle may be $(n-2)/n*180°$. The sides of the polygon usually have a rectilinear course, cf. the aforementioned first region and the aforementioned second region. In at least one, such as in each, corner region of the polygon that is surrounded by the bead arrangement, the associated edge portion may have the aforementioned cutout.

The bead arrangements surrounding the through-openings may have passages for the deliberate local passage of media from the through-opening to or from the electrochemically active region, which passages may be designed for example as openings or as elevations in the bead flanks. These passages may not be arranged in corner regions, but in some cases may also be arranged in corner regions.

A bipolar plate for an electrochemical system is also proposed. The bipolar plate comprises two interconnected separator plates, each of the type described above. Here, the through-openings and the cutouts of the separator plates are arranged in alignment with each other, the bead arrangements of the separator plates pointing away from each other. The separator plates of the bipolar plate usually form an interior space, which is designed for the storage and/or passage of a coolant.

It may be provided that the edge portions of the respective separator plates that are spanned between the bead arrangement and the rim are connected to each other in the respective first region by means of at least one welded joint. Usually no welded joint is provided in the corner region on account of the cutouts in the edge portions. The at least one welded joint may optionally comprise one continuous weld seam or a plurality of welded portions spaced apart from one another in a row. The welded joint may be provided in the above-mentioned contact area. This welded joint is usually provided independently of a circumferential welded joint arranged on the other side of the bead, that is to say is provided in addition thereto.

An electrochemical system is also provided. The electrochemical system comprises a plurality of stacked separator plates of the type described above and/or a plurality of stacked bipolar plates of the type mentioned above, wherein electrochemical cells are formed between adjacent bipolar plates. The electrochemical system may be, for example, a fuel cell system, an electrochemical compressor, a redox flow battery, or an electrolyser.

Exemplary embodiments of the separator plate, of the bipolar plate and of the electrochemical system are shown in the accompanying figures and will be explained in greater detail on the basis of the following description.

Here and in the following, features that recur in different figures are in each case denoted by the same or similar reference signs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
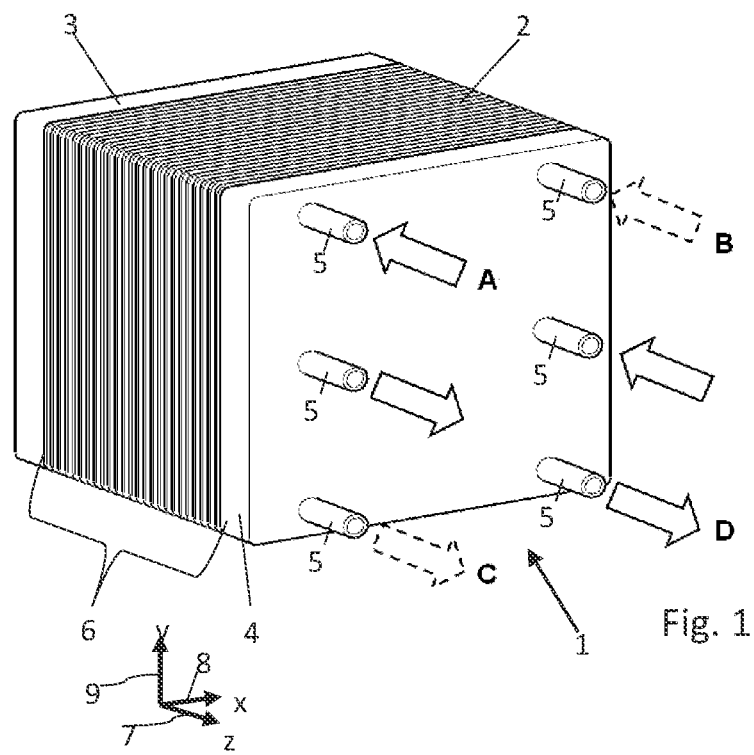
FIG. 1 schematically shows, in a perspective view, an electrochemical system comprising a plurality of separator plates or bipolar plates arranged in a stack.

FIG. 1 shows an electrochemical system 1 with a plurality of identically constructed metallic bipolar plates 2 which are arranged in a stack 6 and are stacked along a z direction 7. The bipolar plates 2 of the stack 6 are clamped between two end plates 3, 4. The z-direction 7 will also be referred to as the stacking direction. In the present example, the system 1 is a fuel cell stack. Two adjacent bipolar plates 2 of the stack each time therefore enclose between them an electrochemical cell, which serves e.g. for converting chemical energy into electrical energy. To form the electrochemical cells of the system 1, in each case a membrane electrode assembly (MEA) is arranged between adjacent bipolar plates 2 of the stack (see e.g. FIG. 2). The MEAs typically contain in each case at least one membrane, e.g. an electrolyte membrane. Furthermore, a gas diffusion layer (GDL) may be arranged on one or both surfaces of the MEA.

In alternative embodiments, the system 1 may also be configured as an electrolyser, as an electrochemical compressor, or as a redox flow battery. Bipolar plates can likewise be used in these electrochemical systems. The structure of these bipolar plates may then correspond to the structure of the bipolar plates 2 explained in detail here, although the media guided on and/or through the bipolar plates in the case of an electrolyser, an electrochemical compressor or a redox flow battery may differ in each case from the media used for a fuel cell system.

The z-axis 7, together with an x-axis 8 and a y-axis 9, spans a right-handed Cartesian coordinate system. The bipolar plates 2 each define a plate plane, in which the separator plates that form the bipolar plates make contact with each other. The separator plates also form their own plate plane in the non-deformed regions thereof, wherein the plate planes of both the bipolar plates and the separator plates are each oriented parallel to the x-y plane and thus perpendicular to the stacking direction or to the z-axis 7. The end plate 4 has a plurality of media ports 5, via which media can be fed to the system 1 and via which media can be discharged from the system 1. Said media that can be fed to the system 1 and discharged from the system 1 may comprise for example fuels such as molecular hydrogen or methanol, reaction gases such as air or oxygen, reaction products such as water vapor or depleted fuels, or coolants such as water and/or glycol.

Figure 2:
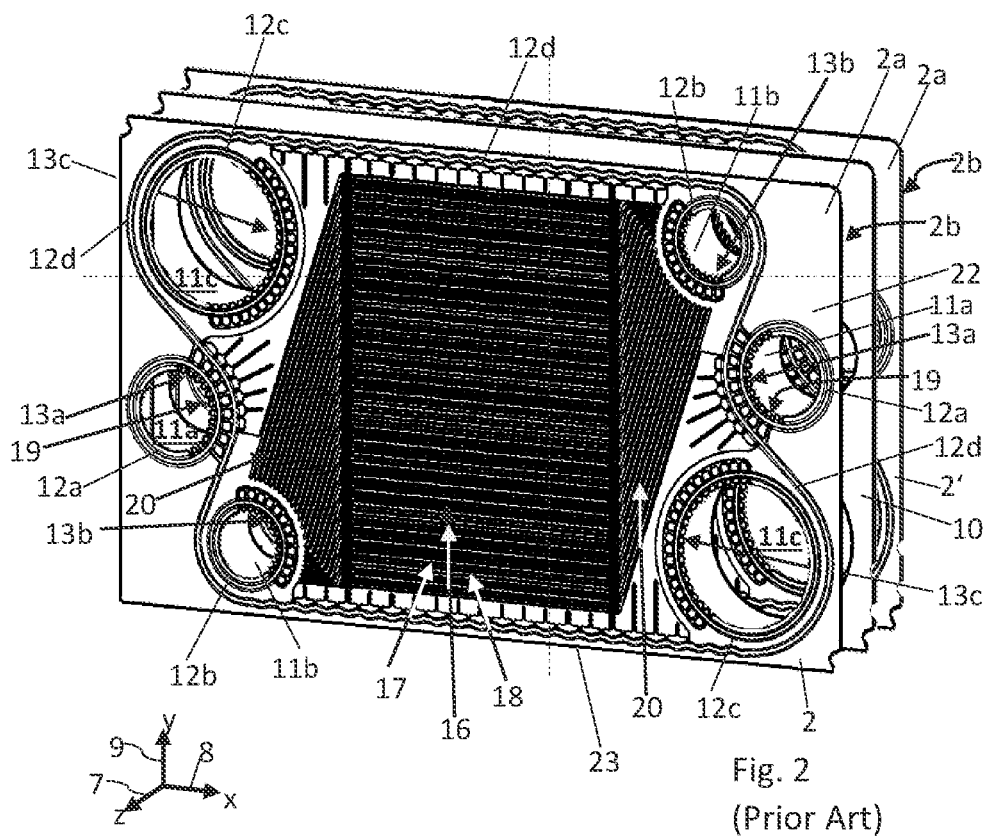
FIG. 2 schematically shows, in a perspective view, two bipolar plates of the system according to FIG. 1 with a membrane electrode assembly (MEA) arranged between the bipolar plates, according to the prior art.

FIG. 2 shows, in a perspective view, two adjacent bipolar plates 2, known from the prior art, of an electrochemical system of the same type as the system 1 from FIG. 1, as well as a membrane electrode assembly (MEA) 10, known from the prior art, which is arranged between these adjacent bipolar plates 2, the MEA 10 in FIG. 2 being largely obscured by the bipolar plate 2 facing towards the viewer. The bipolar plate 2 is formed of two separator plates 2a, 2b which are joined together in a materially bonded manner, of which in each case only the first separator plate 2a facing towards the viewer is visible in FIG. 2, said first separator plate obscuring the second separator plate 2b. The separator plates 2a, 2b may each be manufactured from a metal sheet, for example from a stainless steel sheet. The separator plates 2a, 2b may be joined together e.g. by a material-formed bond, for example welded, soldered or bonded, may be joined by laser-beam welded joints. Bipolar plates 2 which are adjacent to each other delimit one electrochemical cell in each case.

The separator plates 2a, 2b have through-openings which are flush with one another which form through-openings 11a-c of the bipolar plate 2. When a plurality of bipolar plates of the type of the bipolar plate 2 are stacked, the through-openings 11a-c form conduits which extend through the stack 6 in the stacking direction 7 (see FIG. 1). Typically, each of the lines formed by the through-openings 11a-c is fluidically connected to one of the ports 5 in the end plate 4 of the system 1. For example, coolant can be introduced into the stack or discharged from the stack via the lines formed by the through-openings 11a. The conduits formed by the through-openings 11b, 11c on the other hand may be embodied to supply the electrochemical cells of the fuel cell stack 6 of the system 1 with fuel and with reaction gas and also to discharge the reaction products from the stack. The media-conducting through-openings 11a-11c are substantially formed parallel to the plate plane in each case. The through-openings, which are flush with each other, of the successive bipolar plates of a stack together form a conduit in the direction substantially perpendicularly to the plate plane.

To seal off the through-openings 11a-c from the interior of the stack 6 and from the surroundings, the first separator plates 2a each have sealing arrangements in the shape of sealing beads 12a-c, which in each case are arranged around the through-openings 11a-c and completely encompass the through-openings 11a-c in each case. On the rear side of the bipolar plates 2, facing away from the viewer of FIG. 2, the second separator plates 2b have corresponding sealing beads for sealing off the through-openings 11a-c (not shown).

In an electrochemically active region 18, the first separator plates 2a have, on the front side thereof facing towards the viewer of FIG. 2, a flow field 17 with structures 16 for guiding a reaction medium along the front side of the separator plate 2a. In FIG. 2, these structures are defined by a plurality of webs and channels extending between the webs and delimited by the webs. On the front side of the bipolar plates 2, facing towards the viewer of FIG. 2, the first separator plates 2a additionally each have at least one distribution or collection region 20. The distribution or collection region 20 comprises structures which are designed to distribute over the active region 18 a medium that is introduced into the distribution or collection region 20 from a first of the two through-openings 11b, and/or to collect or to pool a medium flowing towards the second of the through-openings 11b from the active region 18. In FIG. 2, the distributing structures of the distribution or collection region 20 are likewise defined by webs and channels extending between the webs and delimited by the webs. Generally, the elements 17, 18, 20 can therefore be regarded as media-conducting embossed structures.

The sealing beads 12a-12c have lead-throughs 13a-13c, the lead-throughs 13a of which are brought out both on the underside of the separator plate 2a which is on top and on the upper side of the separator plate 2b underneath, while the lead-throughs 13b are formed in the separator plate 2a which is on top and the lead-throughs 13c in the separator plate 2b underneath. For example, the lead-throughs 13a make it possible for coolant to pass between the through-opening 12a and the distribution region, so that the coolant arrives in the distribution region between the separator plates or is guided out therefrom. Furthermore, the passages 13b enable a passage of hydrogen between the through-opening 12b and the distribution region on the upper side of the upper separator plate 2a; these passages 13b are characterized by perforations facing towards the distribution region and extending at an angle to the plate plane. Therefore, hydrogen for example flows through the passages 13b from the through-opening 12b to the distribution region on the upper side of the upper separator plate 2a, or in the opposite direction. The passages 13c enable a passage of air for example between the through-opening 12c and the distribution region, so that air reaches the distribution region on the underside of the lower separator plate 2b and is guided out therefrom. The associated perforations are not visible here.

The first separator plates 2a each further have a further sealing arrangement in the shape of a perimeter bead 12d which runs around the flow field 17 of the active region 18, the distribution or collection region 20 and the through-openings 11b, 11c and seals them off from the through-opening 11a, that is to say from the coolant circuit, and from the surroundings of the system 1. The second separator plates 2b each comprise corresponding perimeter beads. The structures 16 of the active region 18, the distributing structures of the distribution or collection region 20 and the sealing beads 12a-d are each formed in one piece with the separator plates 2a and are integrally formed in the separator plates 2a, for example in an embossing, deep-drawing or hydroforming process. The same usually applies to the corresponding distributing structures and sealing beads of the second separator plates 2b. Outside the region surrounded by the perimeter bead 12d, an outer edge region 22 is formed in each separator plate 2a, 2b, in which no channels are arranged. The outer edge region 22 is often flat and extends substantially parallel to the plate plane of the respective separator plate 2a, 2b.

The two through-openings 11b or the lines through the plate stack of the system 1 that are formed by the through-openings 11b are each fluidically connected to one another via passages 13b in the sealing beads 12b, via the distributing structures of the distribution or collection region 20 and via the flow field 17 in the active region 18 of the first separator plates 2a facing towards the viewer of FIG. 2. Analogously, the two through-openings 11c or the lines through the plate stack of the system 1 that are formed by the through-openings 11c are each fluidically connected to one another via corresponding bead passages, via corresponding distributing structures and via a corresponding flow field on an outer side of the second separator plates 2b facing away from the viewer of FIG. 2. In contrast, the through-openings 11a or the lines through the plate stack of the system 1 that are formed by the through-openings 11a are each fluidically connected to one another via a cavity 19 that is enclosed or surrounded by the separator plates 2a, 2b. This cavity 19 serves in each case to guide a coolant through the bipolar plate 2, such as for cooling the electrochemically active region 18 of the bipolar plate 2.

The separator plates 2a, 2b of the bipolar plate 2 may each be formed, for example, from a stainless steel sheet having a thickness of less than 100 μm. The bipolar plate 2 usually has a substantially rectangular shape.

Figure 3:
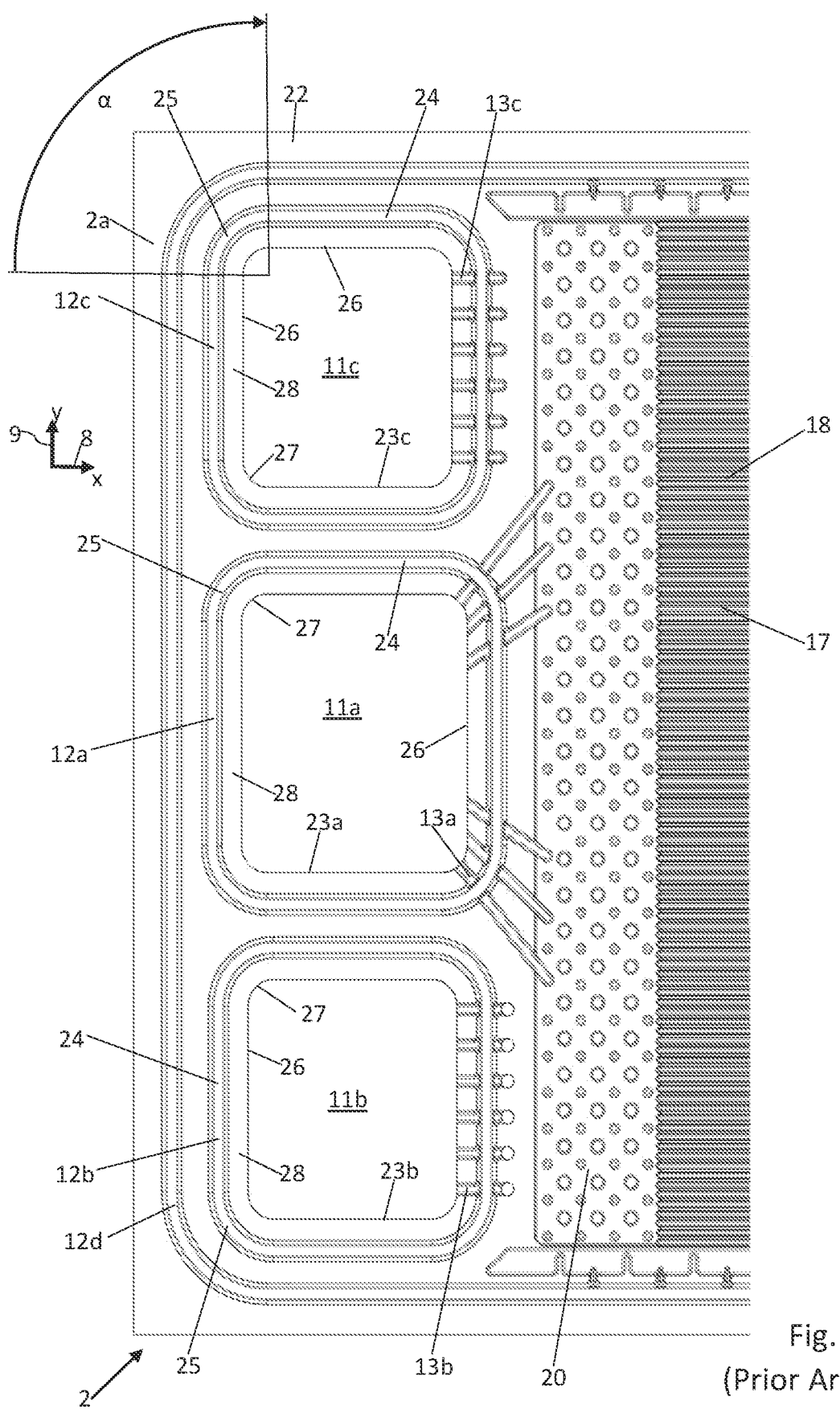
FIG. 3 schematically shows, in a plan view, part of a bipolar plate according to the prior art.

FIG. 3 shows part of another bipolar plate 2 according to the prior art, in a plan view. Like the bipolar plate 2 shown in FIG. 2, the bipolar plate 2 shown in FIG. 3 is assembled from exactly two metal separator plates 2a, 2b, the separator plate 2b being obscured by the separator plate 2a facing towards the viewer of FIG. 3.

The bipolar plate 2 likewise has through-openings 11a-c for passing media through the bipolar plate 2. Here, the through-openings 11a-c at opposite sides or ends of the bipolar plate 2 are fluidically connected to one another. Each of the through-openings 11a-c is surrounded by a sealing bead 12a, 12b, 12c, which sealing beads are designed to seal off the through-openings 11a-c. The sealing beads 12a-c are sometimes referred to as port seals. In addition, the separator plate 2a of the bipolar plate 2 has a perimeter bead 12d. In contrast to the perimeter bead 12d of the bipolar plate 2 shown in FIG. 2, the perimeter bead 12d of the bipolar plate 2 shown in FIG. 3 surrounds not only the active region 18, the distribution or collection regions 20 and the through-openings 11b and 11c, but additionally also the through-openings 11a; it therefore surrounds all the through-openings 11a-11c.

In contrast to the bipolar plate 2 shown in FIG. 2, the distribution or collection regions 20 of the separator plate 2a of the bipolar plate 2 shown in FIG. 3 also have a rectangular or substantially rectangular shape, the edges of the distribution or collection regions 20 extending parallel to the side edges of the bipolar plate 2. The distribution and collection regions 20 have distributing structures which are designed to distribute over the active region 18, as homogeneously as possible, medium that flows from the through-opening 11b to the active region 18, or to collect medium that flows from the active region 18 to the through-opening 11b. In the case of the separator plate 2a of the bipolar plate 2 in FIG. 3, the distributing structures of the distribution or collection regions 20 comprise nub-like elevations instead of linear channels and webs.

In a manner similar to FIG. 2, in the case of the separator plate 2a of the bipolar plate 2 of FIG. 3 the second through-openings bearing the reference sign 11a are fluidically connected to one another via passages 13a through the sealing beads 12a and via a cavity 19 (not visible in the plan view) enclosed by the separator plates 2a, 2b of the bipolar plate 2. The through-openings of the separator plate 2a of the bipolar plate 2 that bear the reference sign 11c are fluidically connected to one another via passages 13c through the sealing beads 12c and via distribution and collection regions 20, as well as via an active region 18 of the separator plate 2b that is obscured in FIG. 3.

In a manner differing from FIG. 2, the through-openings 11a-c of the bipolar plate 2 or of the separator plates 2a, 2b of the bipolar plate 2 each have a substantially rectangular shape. The through-openings 11a-c are each bounded by a rim 23a-c, each rim 23a-c having four corner regions 27 with a curved course and four regions 26 with a rectilinear course located therebetween. An edge portion 28 is spanned between the sealing bead 12a-c and the rim 23a-c, so that the sealing bead 12a-c is situated at a distance from the rim 23a-c. The rims 23a-c of the through-openings 11a-c may be oriented parallel to the side edges of the bipolar plate 2. The through-openings 11a-c are arranged next to one another along the y-direction 9 and thus transversely to the longitudinal direction of the bipolar plate 2 and are oriented symmetrically or substantially symmetrically to one another along the x-direction 8. Due to the rectangular shape of the through-openings 11a-c, a surface area of the bipolar plate 2 or of the separator plates 2a, 2b can be better utilized in comparison to the round through-openings 11a-c of FIG. 2. For instance, a surface area used by the outer edge region 22 can thus be reduced or minimized.

Due to the round shape of the through-openings 11a-c associated therewith, the sealing beads 12a-c of the bipolar plate 2 or separator plates 2a, 2b shown in FIG. 2 usually also have a round course. As a result, a compression of the sealing beads 12a-c of the bipolar plates 2 installed in the system 1 is substantially uniform along the direction of extension thereof.

Due to the substantially rectangular through-openings 11a-c of the bipolar plate 2 or of the separator plates 2a, 2b of FIG. 3, the associated sealing beads 12a-c usually also have a substantially rectangular course, which is composed of four sub-portions 24 and four corner regions 25. Due to the curved or bent shape of the course of the sealing beads 12a-c in the corner regions 25 thereof, the sealing beads 12a-c typically have a greater stiffness there than in the sub-portions 24 thereof, which often have a rectilinear course. The sealing beads 12a-c thus have a varying degree of compression or springback along their course, for example in the installed state of the bipolar plate 2 or in the stack 6.

Due to the large number of bipolar plates 2 or individual plates 2a, 2b in the stack 6, a small difference in the compression and springback of the respective sealing bead 12a-c along its course in a single bipolar plate 2 or in a single metal separator plate 2a, 2b can lead to a relatively large difference in the springback of the sealing beads 12a-c connected in series, so that small differences in the individual separator plates 2a, 2b can have a significant effect on the leaktightness of the stack 6 as a whole.

The present disclosure has been conceived on the one hand to make the most efficient possible use of the surface area of the bipolar plate 2 or of the separator plates 2a, 2b, and on the other hand to ensure the best possible leaktightness in the region of the through-openings 11a-c.

Various embodiments of the present disclosure are shown in FIGS. 4A-7, with only part of one of the through-openings 11a-c being shown here for the sake of clarity. To make it clear that this can be any one of the through-openings 11a-c, the elements 11 and 12 will hereinafter be used without the distinguishing letters a, b or c that have been used above.

It can be seen from FIGS. 4A-7 that the through-opening 11 has a rim 23 that delimits the through-opening 11, the rim 23 having at least one corner region 27 with a curved course and a first region 26 with a rectilinear first course that adjoins the corner region 27. The other side of the corner region 27 is usually adjoined by a second region 26 with a rectilinear second course. In other words, the first region 26 and the second region 26 adjoin the corner region 27 on both sides. Due to their structural and functional similarity, both rectilinear regions 26 bear the same reference sign. Features that are mentioned below only in relation to the first region 26 can also apply to the second region 26, and vice versa.

Also provided is a bead arrangement 12 in the form of a sealing bead, which extends around the corner region 27, the first region 26 and the second region 26. An edge portion 28 is spanned between the bead arrangement 12 and the rim 23, so that the bead arrangement 12 is situated at a distance from the rim 23. The edge portion 28 has a cutout 30 in the corner region 27, so that a minimum distance $d_1$ of the bead arrangement 12 from the rim 23 in the corner region 27 is smaller than a minimum distance $d_2$ of the bead arrangement 12 from the rim 23 in the adjoining region 26 with the rectilinear course. Due to the reduced distance $d_1$ of the bead arrangement 12 from the rim 23, a stiffness of the corner region 25 of the bead arrangement 12 in the corner region 27 of the through-opening 11 can be reduced, and can be matched to the stiffness of the adjoining sub-portion 24 of the bead arrangement 12.

Figure 4A:
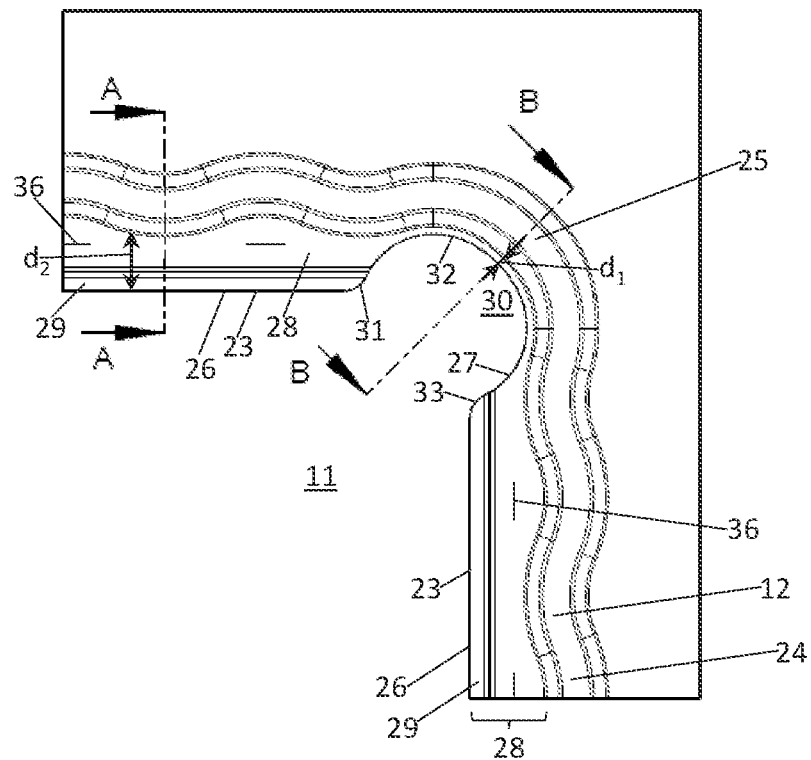
FIG. 4 schematically shows, in three sub-FIGS. 4A, 4B, 4C, part of a separator plate in the region of a through-opening according to one embodiment, in plain view and in two sectional views.
Figure 5:
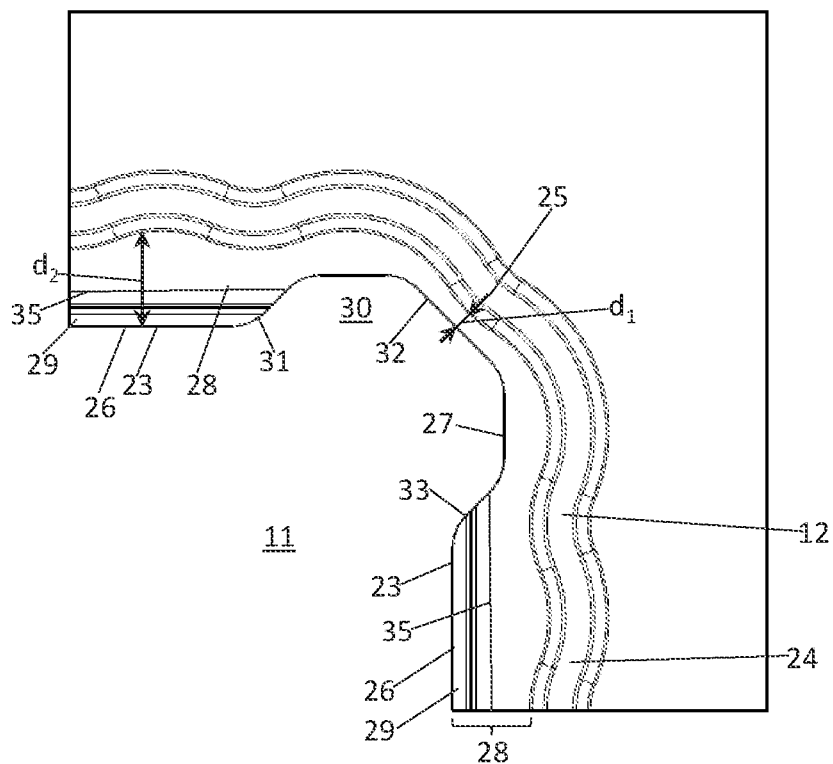
FIG. 5 schematically shows part of a separator plate in the region of a through-opening according to another embodiment.
Figure 7:
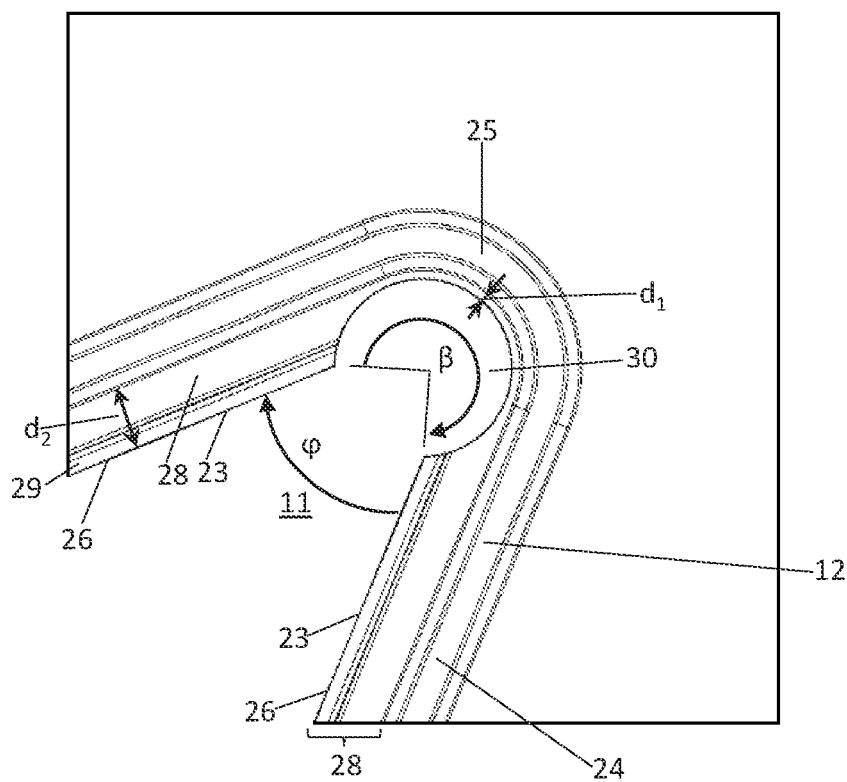
FIG. 7 schematically shows part of a separator plate in the region of a through-opening according to another embodiment.
Figure 6A:
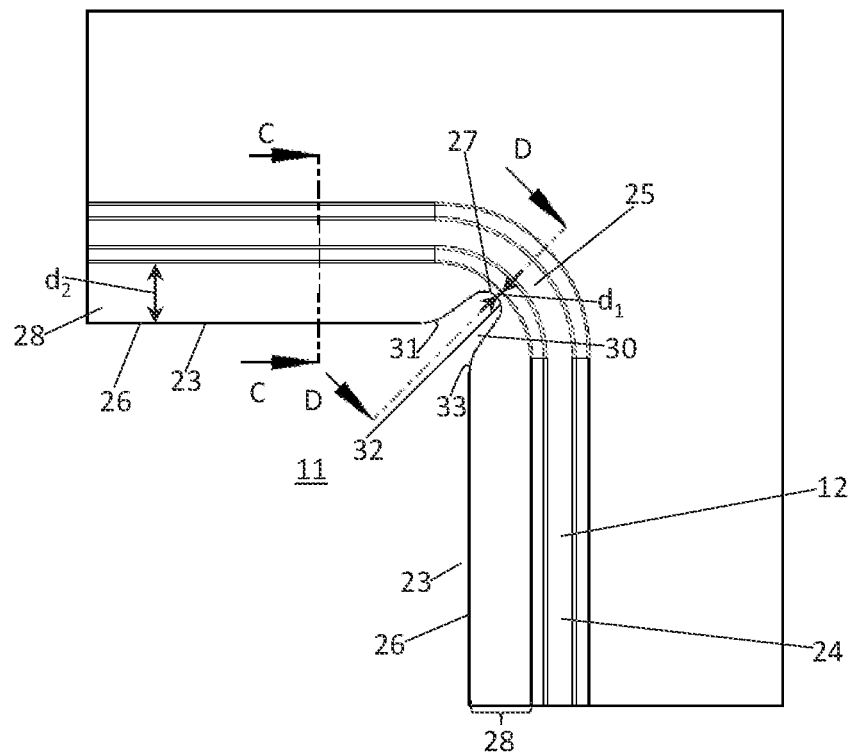
FIG. 6 schematically shows, in three sub-FIGS. 6A, 6B, 6C, part of a separator plate in the region of a through-opening according to another embodiment, in plain view and in two sectional views.

It can be seen in FIGS. 4A, 6A and 7 that the cutout 30 faces a concave portion of the bead arrangement 12. In FIG. 5, due to the wavy course of the bead 12 therein even in the corner region 25, the cutout 30 faces a plurality of concave portions of the bead arrangement 12.

In the region of the cutout 30, the rim 23 usually has a central concave region 32, which is flanked on both sides by convex regions 31, 33. The convex regions 31, 33 of the rim 23 each directly adjoin the rectilinear portions 26 of the rim 23. In an optional embodiment, the rim 23 and the bead arrangement 12 have in part an identical or similar course in the region of the cutout 30, so that the minimum distance $d_1$ of the bead arrangement 12 from the rim 23 is constant there. Such an embodiment can be seen, for example, in FIGS. 4A, 4C and 7.

In the region of the cutout 30, the rim 23 may follow at least in part a segment of a circle, a segment of an oval or a segment of an ellipse. A radius of curvature of the cutout 30 may therefore in part be constant (for example in the case of a segment of a circle) or may vary along the rim 23. In some embodiments, the radius of curvature of the cutout 30 is at least 3 mm. In the case of a cutout that is shaped rather as a slot, as shown in FIG. 6A, the radius of curvature may also be less than 3 mm, but it should not be less than 0.5 mm. Due to the fact that the bead arrangement 12 is arranged around the cutout and is situated further outwards, the radius of curvature thereof is usually larger. It may be provided that a radius of curvature of the course of the bead arrangement 12 relative to the neutral axis N of the bead arrangement 12 in the region of the cutout 30 is at least 5 mm.

The regions 26 of the rim 23 that extend rectilinearly are usually oriented at an angle to each other and enclose a first angle φ. For the sake of clarity, this first angle φ has only been shown in FIG. 7; however, in the embodiments of FIGS. 4A-6, the regions 26 of the rim 23 are similarly oriented at an angle to each other. While the first angle φ is smaller than 90° in FIG. 7, it can also be 90° (cf. FIGS. 4A-6) or more, depending on the shape of the through-opening 11. Due to the fact that the edge portion 28 in FIGS. 4A-7 has a cutout 30, and that the convex region 31, the concave region 32 and the convex region 33 alternate, a circumferential angle β of the rim 23 in the region of the cutout 30 is larger than the first angle φ, for example at least 10% or at least 20% larger.

In the case of merely a rounded corner of the rim 23 without a cutout 30 in the corner region 27 of the through-opening 11, the associated circumferential angle β of the rim 23 would be equal to the first angle φ. For comparison, FIG. 3 shows an angle α that is enclosed by the rectilinear portions 26 of the rim 23. In the corner region 27, a circumferential angle of the rim 23 is equal to the angle α, and in FIG. 3 is approximately 90° due to the rectangular shape of the through-openings 11a-c.

The edge portions 28 of the respective separator plates 2a, 2b that are spanned between the bead arrangement 12 and the rim 23 are often connected to each other by means of at least one welded joint. It should be noted here that no welded joint is provided in the corner region 27 due to the cutouts 30 in the edge portions 28. The at least one welded joint may comprise one continuous weld seam 35 (cf. FIG. 5) or a plurality of welded portions 36 spaced apart from one another in a row (cf. FIG. 4A-C). The welded portions 36 of FIG. 4A-C may face concave portions of the wavy bead arrangement 12. The weld seam 35 and the welded portions 36 are advantageously arranged in a region of the edge portions 28 that lies approximately in the middle between the rim 23 and the bead foot; in the example of FIG. 4A, it is at a distance greater than $d_1$ from the rim 23. For instance, no weld seam 35 or no welded portion 36 is present in the region of the cutout 30.

Figure 4B:
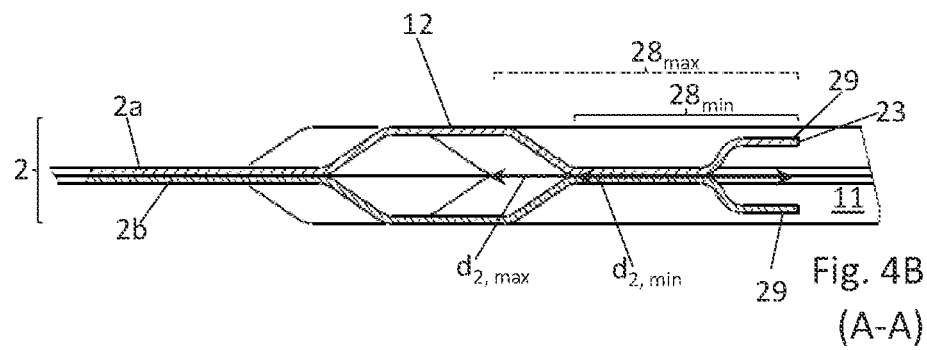
Figure 4C:
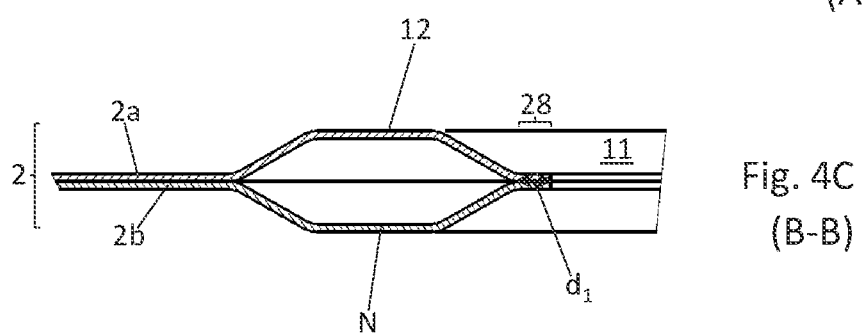
Figure 6B:
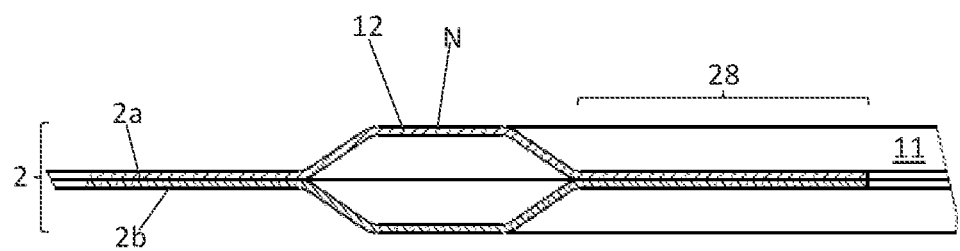
Figure 6C:
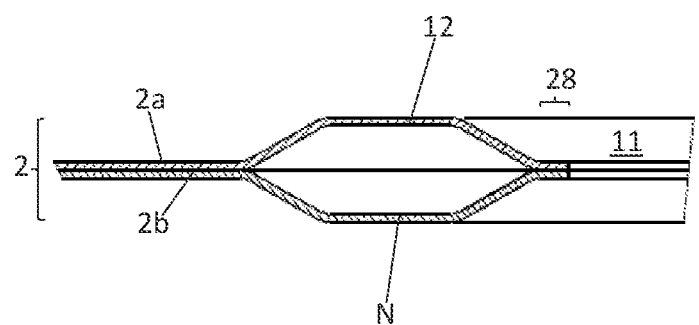

To further equalize the stiffnesses of the regions 24, 25 of the bead arrangement 12, and/or to stiffen the edge portion 28 in the rectilinear regions 26 of the rim 23, a stiffening structure 29 for reinforcing the edge portion 28 may be provided in the first region 26. In contrast, no such stiffening structure is provided in the corner region 27 on account of the cutout 30. Optionally, the rim 23 projects at least in part out of a plate plane defined by the separator plate 2a, 2b, wherein the rim 23 projecting out of the plate plane forms the stiffening structure 29 for the edge portion 28. Wherever the rim 23 projects out of the plate plane, the separator plates 2a, 2b can move apart and be situated at a distance from each other in the z-direction, as shown in FIG. 4B. Alternatively, the rims 23 of the two separator plates 2a, 2b may also project in the same direction and bear against each other, but this is not shown here. FIG. 6B, by contrast, shows an embodiment in which the stiffening structure 29 has been omitted.

As explained above on the basis of FIGS. 2 and 3, the separator plates 2a, 2b can be joined together to form a bipolar plate 2. In this case, the through-openings 11 and the cutouts 30 of the separator plates 2a, 2b are arranged in alignment with each other, the bead arrangements 12 of the separator plates 2a, 2b pointing away from each other, as illustrated in FIGS. 4A, 4B, 4C, 6A, 6B, 6C.

In the contact area, the separator plates 2a, 2b bear flat against each other at least in part and make contact with each other. The contact area and the edge portion 28 may be formed by the same element. The separator plates 2a, 2b may be connected to each other in the contact area in a materially bonded manner, for example by means of at least one welded joint, laser-welded joint, soldered joint and/or adhesive bond, cf. also the welded joints 35, 36 mentioned above.

The bead arrangement 12 may have a periodic course, such as a wavy course, in a portion facing the first region 26, cf. FIGS. 4A-C and 5. In alternative embodiments, the course of the bead arrangement 12 has a rectilinear course in a portion facing the first region 26, cf. FIGS. 6 and 7. The bead arrangement 12 may have an arc-shaped course in a portion facing the cutout 30, cf. FIGS. 4A-C, 6 and 7. In the embodiment of FIG. 5, the bead arrangement 12 has a wavy course in the portion facing the cutout 30. In many cases, the bead arrangement 12 has a substantially flat bead top, at least one bead flank adjoining the bead top, and for each bead flank a bead foot adjoining the bead flank, cf. FIGS. 4A-7, for instance the sectional views of FIGS. 4B, 4C, 6B, 6C. However, the bead arrangement 12 is not limited to this. Alternatively, the bead arrangement 12 may have a curved bead top that merges directly into curved or rectilinear bead flanks, and for each bead flank a bead foot adjoining the bead flank. It is clear from FIGS. 4B and 4C or 6B and 6C that the above-mentioned distance $d_1$ or $d_2$ starts in each case at the beginning of the bead arrangement 12, that is to say the bead foot, and extends as far as the rim 23 of the respective layer 2a, 2b; it covers the entire width of the region 28. Due to the wavy course of the bead 12, this distance $d_2$ varies between $d_{2,min}$ and $d_{2,max}$ in FIG. 4B, whereas it remains constant in FIG. 6B.

It should be emphasized at this point that at least some features shown in FIGS. 1-3 can be combined with the features shown in FIGS. 4A-7, provided that they do not contradict each other.

FIGS. 1-7 are shown approximately to scale. FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A separator plate for an electrochemical system, comprising:
    at least one through-opening for the passage of a fluid, having a rim that delimits the through-opening, wherein the rim has at least one corner region with a curved course and a first region with a rectilinear first course that adjoins the corner region; and a bead arrangement that extends around the corner region and the first region,
    wherein an edge portion is spanned between the bead arrangement and the rim, so that the bead arrangement is situated at a distance from the rim,
    wherein, in the corner region, the edge portion has a cutout so that a minimum distance of the bead arrangement from the rim is smaller in the corner region than in the first region.

2. The separator plate according to claim 1, wherein the cutout faces a concave portion of the bead arrangement.

3. The separator plate according to claim 1, wherein, in the region of the cutout, the rim has a course in which at least one convex region, at least one concave region and at least one convex region alternate.

4. The separator plate according to claim 1, wherein, in the region of the cutout, the rim follows at least in part a segment of a circle, a segment of an oval or a segment of an ellipse.

5. The separator plate according to claim 1, wherein, in the region of the cutout, the rim and the bead arrangement have at least in part an identical course, so that the minimum distance of the bead arrangement from the rim is constant in the region of the identical course.

6. The separator plate according to claim 1, wherein the rim has a second region with a rectilinear second course that adjoins the corner region, wherein the first region and the second region adjoin different sides of the corner region.

7. The separator plate according to claim 6, wherein the first region with the rectilinear first course and the second region with the rectilinear second course are oriented at an angle to each other and enclose a first angle, wherein a circumferential angle of the rim in the region of the cutout is larger than the first angle.

8. The separator plate according to claim 1, wherein a stiffening structure for strengthening the edge portion is provided in the first region, wherein no such stiffening structure is provided in the corner region on account of the cutout.

9. The separator plate according to claim 8, wherein the rim projects at least in part out of a plate plane defined by the separator plate, wherein the rim projecting out of the plate plane forms the stiffening structure for the edge portion.

10. The separator plate according to claim 1, wherein the bead arrangement has a periodic course in a portion facing the first region.

11. The separator plate according to claim 1, wherein the bead arrangement has an arc-shaped course in a portion facing the cutout.

12. The separator plate according to claim 1, the bead arrangement having:
- a substantially flat bead top, at least one bead flank adjoining the bead top, and for each bead flank a bead foot adjoining the bead flank, or
- a curved bead top that merges directly into curved or rectilinear bead flanks, and for each bead flank a bead foot adjoining the bead flank.

13. The separator plate according to claim 1, wherein a radius of curvature of the cutout is at least 3 mm, and/or a radius of curvature of the course of the bead arrangement relative to the neutral axis of the bead arrangement in the region of the cutout is at least 5 mm.

14. A bipolar plate for an electrochemical system, comprising two interconnected separator plates each according to claim 1, wherein the through-openings and the cutouts of the separator plates are arranged in alignment with each other, the bead arrangements of the separator plates pointing away from each other.

15. The bipolar plate according to claim 14, wherein the edge portions of the respective separator plates that are spanned between the bead arrangement and the rim are connected to each other by means of at least one welded joint, wherein no welded joint is provided in the corner region on account of the cutouts in the edge portions.

16. The bipolar plate according to claim 15, wherein the at least one welded joint comprises one continuous weld seam or a plurality of welded portions spaced apart from one another in a row.

17. An electrochemical system, comprising a plurality of stacked separator plates according to claim 1.

18. The separator plate according to claim 1, wherein, in the at least one corner region, the rim comprises a major arc between the first region with the rectilinear first course and a second region with a rectilinear second course.

19. The separator plate according to claim 1, wherein the rim comprises a first rectilinear segment, a second rectilinear segment, and an arc, wherein the first rectilinear segment comprises the first region with the rectilinear first course, wherein the first rectilinear segment is arranged at an angle with respect to the second rectilinear segment, and wherein the first rectilinear segment and the second rectilinear segment are connected to one another by the arc.

* * * * *